(12) United States Patent
Eftekhari

(10) Patent No.: US 12,482,888 B2
(45) Date of Patent: Nov. 25, 2025

(54) TRACTION BATTERY PACK ENCLOSURE BARRIER AND TRACTION BATTERY PACK ASSEMBLY METHOD

(71) Applicant: Ford Global Technologies, LLC, Dearborn, MI (US)

(72) Inventor: Mohammadreza Eftekhari, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 611 days.

(21) Appl. No.: 17/887,809

(22) Filed: Aug. 15, 2022

(65) Prior Publication Data

US 2023/0307757 A1   Sep. 28, 2023

Related U.S. Application Data

(60) Provisional application No. 63/322,766, filed on Mar. 23, 2022.

(51) Int. Cl.
| | |
|---|---|
| *H01M 50/209* | (2021.01) |
| *H01M 50/224* | (2021.01) |
| *H01M 50/249* | (2021.01) |
| *H01M 50/258* | (2021.01) |
| *H01M 50/293* | (2021.01) |
| *H01M 50/30* | (2021.01) |

(52) U.S. Cl.
CPC ....... *H01M 50/209* (2021.01); *H01M 50/224* (2021.01); *H01M 50/249* (2021.01); *H01M 50/258* (2021.01); *H01M 50/293* (2021.01); *H01M 50/30* (2021.01); *H01M 2220/20* (2013.01)

(58) Field of Classification Search
CPC ............ H01M 50/209; H01M 50/249; H01M 50/203; H01M 50/30
See application file for complete search history.

(56) References Cited

U.S. PATENT DOCUMENTS

| | | | |
|---|---|---|---|
| 5,456,994 A * | 10/1995 | Mita | ................... H01M 10/625 |
| | | | 429/71 |
| 8,163,420 B2 | 4/2012 | Okada et al. | |
| 8,507,125 B2 | 8/2013 | Meschter | |
| 2009/0169978 A1 | 7/2009 | Smith et al. | |
| 2014/0329137 A1 | 11/2014 | Martinez et al. | |
| 2016/0133896 A1* | 5/2016 | Baek | ....................... B60L 50/15 |
| | | | 429/72 |

* cited by examiner

*Primary Examiner* — Kenneth J Douyette
(74) *Attorney, Agent, or Firm* — David B. Kelley; Carlson, Gaskey & Olds, P.C.

(57) ABSTRACT

A traction battery pack assembly includes first and second cell stacks each disposed along a cell stack axis and an enclosure assembly that encloses an interior area. The enclosure assembly has an enclosure structure that holds the first and second cell stacks within a cell-receiving area. The enclosure structure compresses the first cell stack along the cell stack axis of the first cell stack. The enclosure structure compresses the second cell stack along the cell stack axis of the second cell stack. The assembly further includes divider positioned between the first and second cell stacks. The divider partitions the interior area.

20 Claims, 3 Drawing Sheets

TRACTION BATTERY PACK ENCLOSURE BARRIER AND TRACTION BATTERY PACK ASSEMBLY METHOD

CROSS-REFERENCE TO RELATED APPLICATIONS

This application claims priority to U.S. Provisional Application No. 63/322,766, which was filed on 23 Mar. 2022 and is incorporated herein by reference

TECHNICAL FIELD

This disclosure relates generally to a method of partitioning areas a traction battery pack.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack assembly can power the electric machines. The traction battery pack assembly of an electrified vehicle can include groups of battery cells.

SUMMARY

In some aspects, the techniques described herein relate to a traction battery pack assembly, including: first and second cell stacks each disposed along a cell stack axis; an enclosure assembly that encloses an interior area, the enclosure assembly having an enclosure structure that holds the first and second cell stacks within a cell-receiving area, the enclosure structure compressing the first cell stack along the cell stack axis of the first cell stack, the enclosure structure compressing the second cell stack along the cell stack axis of the second cell stack; and a divider positioned between the first and second cell stacks, the divider partitioning the interior area.

In some aspects, the techniques described herein relate to a traction battery pack assembly, wherein the enclosure structure is a stamped sheet metal enclosure structure.

In some aspects, the techniques described herein relate to a traction battery pack assembly, wherein the enclosure structure circumferentially surrounds the cell stack.

In some aspects, the techniques described herein relate to a traction battery pack assembly, wherein the enclosure structure is an enclosure tray.

In some aspects, the techniques described herein relate to a traction battery pack assembly, wherein the enclosure assembly further includes an enclosure cover, the divider extending from a floor of the enclosure tray to the enclosure cover.

In some aspects, the techniques described herein relate to a traction battery pack assembly, wherein the enclosure cover includes a first enclosure venting opening configured to communicate vented gas from the area of the interior that contains the first cell stack, and a second enclosure venting opening configured to communicate vented gas from the area of the interior that contains the second cell stack.

In some aspects, the techniques described herein relate to a traction battery pack assembly, wherein the first and second cell stacks each include a first load plate at a first axial end of the cell stack and a second load plate at an opposite second axial end of the cell stack, wherein the first and second cell stacks rest on a floor of the enclosure structure, wherein the divider extends from the floor past the first and second load plates of the first and second cell stacks.

In some aspects, the techniques described herein relate to a traction battery pack assembly, wherein the first load plate and the second load plate directly contact the enclosure structure, wherein the divider directly contacts the enclosure structure and an enclosure cover of the enclosure assembly.

In some aspects, the techniques described herein relate to a traction battery pack assembly, wherein the divider is foam.

In some aspects, the techniques described herein relate to a traction battery pack assembly, wherein the divider fluidly isolates an area of the interior that contains the first cell stack from an area of the interior that contains the second cell stack.

In some aspects, the techniques described herein relate to a traction battery pack assembly, wherein the enclosure structure includes a first enclosure venting opening configured to communicate vented gas from the area of the interior that contains the first cell stack, and a second enclosure venting opening configured to communicated vented gas from the area of the interior that contains the second cell stack.

In some aspects, the techniques described herein relate to a traction battery pack assembly, wherein the divider is adhesively secured to the first and second cell stacks.

In some aspects, the techniques described herein relate to a battery pack assembly method, including: using an enclosure structure of an enclosure assembly to compress first and second cell stacks that are received within a cell-receiving area of the enclosure structure; enclosing the first and second cell stacks within an interior of the enclosure assembly; and partitioning the interior with a divider so that an area of the interior that contains the first cell stack is separated from an area of the interior that contains the second cell stack.

In some aspects, the techniques described herein relate to a method, wherein the divider is a foam divider.

In some aspects, the techniques described herein relate to a method, wherein the enclosure structure is an enclosure tray, wherein the divider extends from a floor of the enclosure tray to an enclosure cover of the enclosure assembly.

In some aspects, the techniques described herein relate to a method, further including adhesively securing the divider to both the first cell stack and the second cell stack.

In some aspects, the techniques described herein relate to a method, further including venting the area of the interior that contains the first cell stack through a first enclosure venting opening and venting the area of the interior that contains the second cell stack through a second enclosure venting opening that is separate from the first enclosure venting opening.

In some aspects, the techniques described herein relate to a method, wherein the first and second enclosure venting opening are in the enclosure structure.

In some aspects, the techniques described herein relate to a method, wherein the enclosure structure is an enclosure tray. 20.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details example traction battery pack assemblies having at least one divider and a plurality of cell stacks housed within an enclosure. The cell stacks can each include a plurality of individual battery cells.

Occasionally, a thermal propagation event could lead to increased pressure and temperature in one of the battery cells. The increasing pressure and temperature can rupture the battery cell, which results in a venting of gas from the interior of the battery cell. The traction battery pack communicate the vented gas from an interior of the enclosure to an ambient environment that is outside the traction battery pack and outside the electrified vehicle.

The divider partitions areas of the enclosure to contain gas vented from battery cells of the cell stacks. The can help to inhibit thermal energy passing to other cell stacks and leading to a thermal runaway condition.

Figure 1:
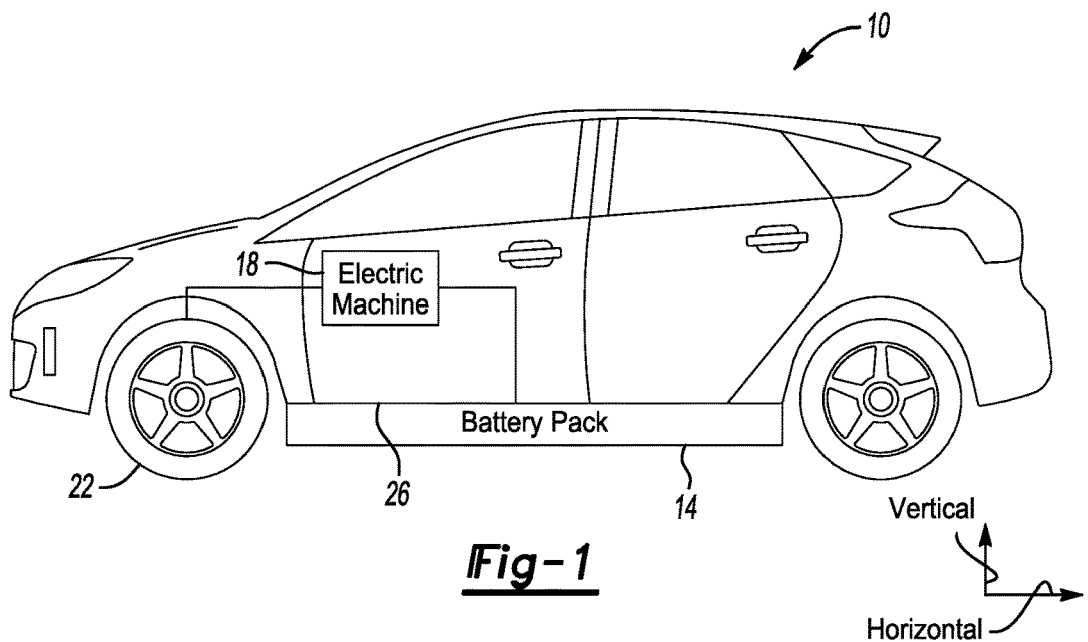
FIG. 1 illustrates a side view of an electrified vehicle.

With reference to FIG. 1, an electrified vehicle 10 includes a traction battery pack 14, an electric machine 18, and wheels 22. The traction battery pack 14 powers an electric machine 18, which can convert electrical power to torque to drive the wheels 22.

The traction battery pack 14 is, in the exemplary embodiment, secured to an underbody 26 of the electrified vehicle 10. The traction battery pack 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a traction battery pack.

Figure 2:
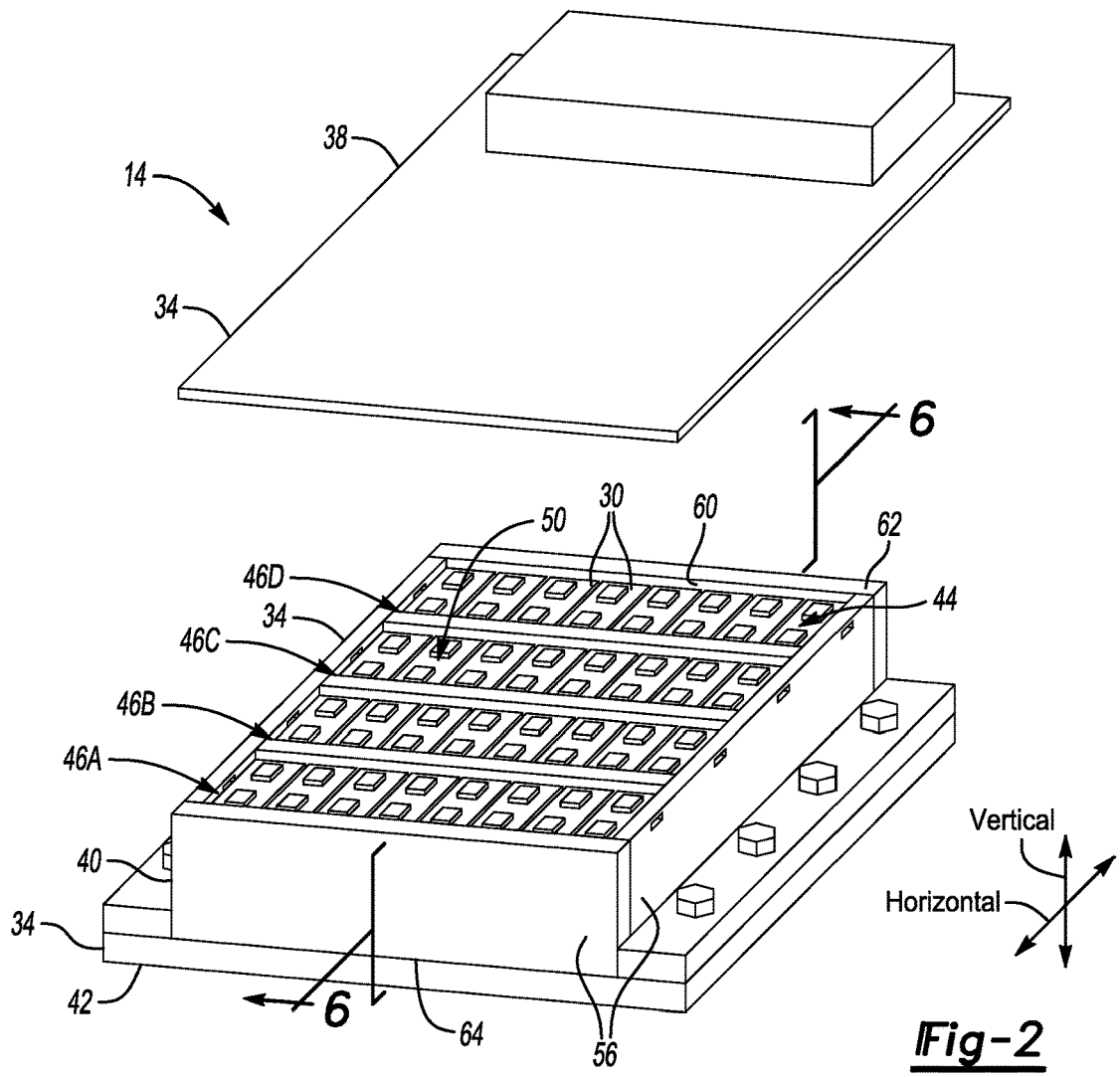
FIG. 2 illustrates a partially expanded view of a traction battery pack assembly from the electrified vehicle of FIG. 1 according to an exemplary aspect of the present disclosure.

With reference now to FIG. 2, the traction battery pack 14 includes a plurality of battery cells 30 held within an enclosure assembly 34. In the exemplary embodiment, the enclosure assembly 34 comprises various enclosure structures. In particular, the example enclosure assembly 34 includes an enclosure cover 38, an enclosure halo 40, and an enclosure floor 42. The enclosure cover 38, enclosure halo 40, and enclosure floor 42 are secured together to provide an interior area 44 that houses the plurality of battery cells 30. The enclosure cover 38, enclosure halo 40, and enclosure floor 42, all different types of enclosure structures. The enclosure cover 38, enclosure halo 40, and enclosure floor 42 enclose the interior area 44.

The plurality of battery cells (or simply, "cells") 30 are for supplying electrical power to various components of the electrified vehicle 10. The battery cells 30 are grouped and stacked along an axis to construct one of a plurality of cell stacks 46A-46D, which are then positioned side-by-side to provide a cell matrix 50. In this example, each cell stack 46 includes eight individual battery cells 30, and the cell matrix 50 includes four cell stacks 46.

Although a specific number of battery cells 30 and cell stacks 46 are illustrated in the various embodiments of this disclosure, the traction battery pack 14 could include any number of cells 30 and cell stacks 46A-46D. In other words, this disclosure is not limited to the specific configuration of cells 30 shown in FIG. 2.

The enclosure halo 40, in this example, includes a plurality of sidewalls 56 arranged relative to one another to provide a cell-receiving area 60. The sidewalls 56 can be extruded structures connected together by welding, for example. When assembled, the example sidewalls 56 circumferentially surround the cell stacks 46A-46D.

When the traction battery pack 14 is assembled, the enclosure cover 38 can be secured to a vertically upper side 62 of the enclosure halo 40. An interface between the enclosure cover 38 and the enclosure halo 40 extends circumferentially continuously about the interior area 44. When the traction battery pack 14 is assembled, the enclosure floor 42 can be secured to vertically lower side 64 of the enclosure halo 40. An interface between the enclosure floor 42 and the enclosure halo 40 extends circumferentially continuously about the interior area 44. The enclosure floor 42 and the sidewalls 56, when secured together, provide an enclosure tray.

Mechanical fasteners or welds, for example, can be used to secure the enclosure cover 38 and the enclosure floor 42 to the enclosure halo 40. Vertical and horizontal, for purposes of this disclosure, is with reference to ground and a general orientation of the electrified vehicle 10 during operation.

In some examples, the enclosure floor 42 and the sidewalls 56 are not separate structures that are secured together. Instead an enclosure tray can be stamped from a sheet metal blank. The stamped sheet metal tray can be a singular enclosure structure that includes a floor and sidewalls to provide the enclosure halo 40.

When the traction battery pack 14 is assembled, the cell matrix 50 is positioned within the cell-receiving area 60. The example enclosure halo 40 includes one cell-receiving area 60, but it should be understood that this disclosure also extends to enclosure assemblies providing more than one cell-receiving area. The enclosure cover 38 can cover the cell matrix 50 within the cell-receiving area 60 to substantially surround the cell matrix 50 (i.e., the cell stacks 46A-46D) from all sides.

The enclosure halo 40 compresses and holds the cell matrix 50 when the cell matrix 50 is inserted into the cell-receiving area 60 of the enclosure halo 40. In this example, the sidewalls 56 of the enclosure halo 40 apply forces to the cell matrix 50 when the cell matrix 50 is positioned within the cell-receiving area 60.

The traction battery pack 14 can be considered a cell-to-pack battery assembly. Unlike conventional traction battery pack battery assemblies, a cell-to-pack battery assembly incorporates battery cells or other energy storage devices into the enclosure assembly 34 without the cells being arranged in arrays or modules. The enclosure assembly 34 applies compressive forces to the cells. The cell-to-pack battery assembly may therefore eliminate most, if not all, of the array support structures used in conventional cell stacks (e.g., array frames, spacers, rails, walls, endplates, bindings, etc.) that are used to group and hold the battery cells within the arrays/modules.

The cell matrix 50 of the exemplary traction battery pack 14 comprises a plurality of separate cell stacks 46A-46D, which are simultaneously inserted into the cell-receiving area of the enclosure halo 40. To insert the example cell matrix 50 into the cell-receiving area 60, the cells stacks 46 of the cell matrix 50 are compressed and, while compressed, moved into place in the cell-receiving area 60. The fixturing relied on to compress the cell stacks 46 can be removed as the cell matrix 50 is inserted. The cell stacks 46 can expand somewhat within the enclosure assembly 34, but are still compressed by the enclosure assembly 34.

Figure 3:
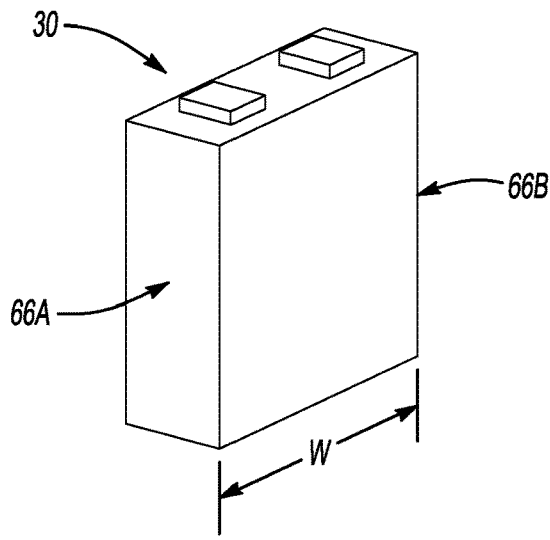
FIG. 3 illustrates a battery cell from the traction battery pack assembly of FIG. 2.

With reference now to FIG. 3 and continued reference to FIGS. 1 and 2, the battery cells 30 of the exemplary embodiment are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

The example battery cells 30 each include a first laterally facing side 66A and an opposite, second laterally facing side 66B. When the battery cells 30 are assembled into cell stacks 46 within the traction battery pack assembly 14, the first and second laterally facing sides 66A, 66B face horizontally outward away from the axis of the respective cell stack 46.

Figure 4:
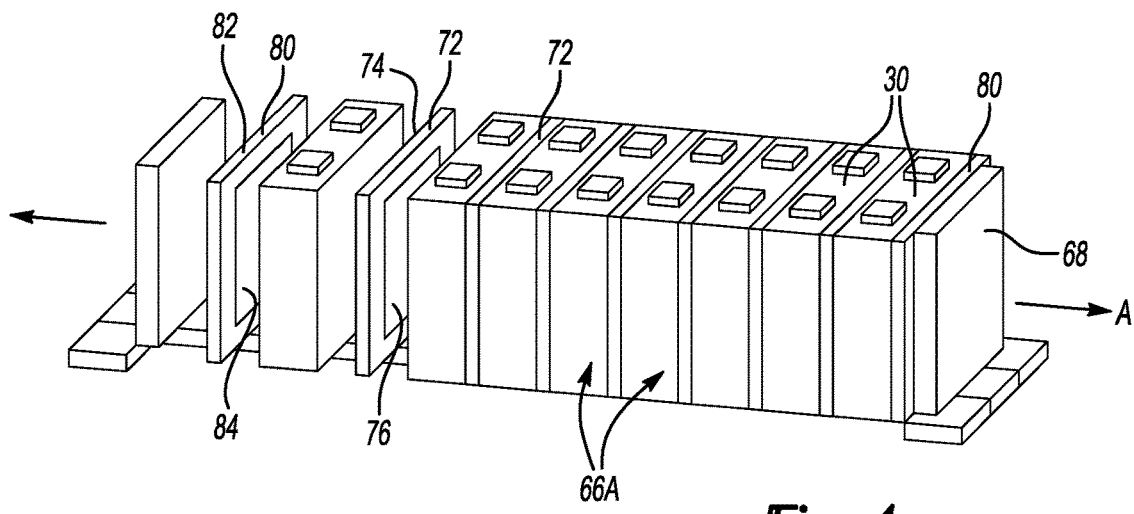
FIG. 4 illustrates a group of cells being compressed by a compression fixture to provide a cell stack for the traction battery pack assembly of FIG. 2.
Figure 5:
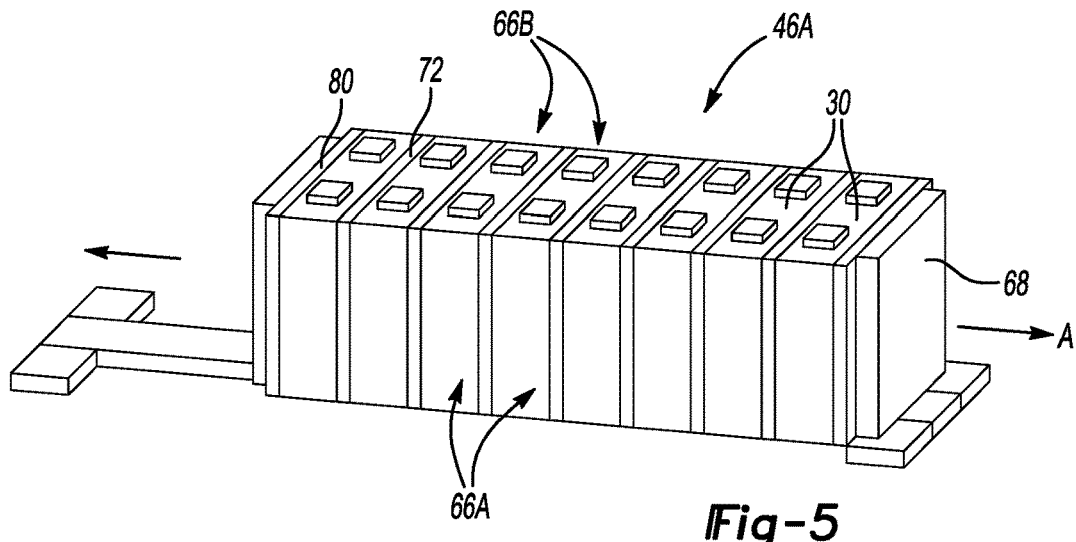
FIG. 5 illustrates the group of cells of FIG. 4 compressed by the compression fixture and providing the cell stack.

An exemplary method of assembling the traction battery pack 14 includes distributing a first group of cells 30 along a cell stack axis A, and then compressing the first group of cells 30 along the cell stack axis A as shown in FIGS. 4 and 5 to provide one of the cell stacks 46A.

In this example, a compression fixture 68 is used to compress the cells 30 along the cell stack axis A. The compressive force exerted on the cells 30 by the compression fixture 68 is 3 kilonewtons in some examples. The compression fixture 68 could be driven by a pneumatic actuator, for example, to compress the cells 30 along the cell stack axis A.

In this example, within the cell stacks 46A, separator plates 72 are disposed between each of the cells 30 along the cell stack axis A. The separator plates 72 can include a frame portion 74 that holds a compressible material 76. The compressible material 76 can compress to permit some expansion of the cells 30. The compressible material 76 can be foam.

Load plates 80 are disposed at opposing axial ends of the cells 30 of the cell stack 46A. The load plates 80 include a frame portion 82 that holds a compressible material 84. The compressible material 76 can be foam. The compressible material 84 can compress to permit some expansion of the cells 30.

The grouping, aligning, and compressing is repeated to provide each of the remaining cell stacks 46B-46D that will combine to form the cell matrix 50 of the traction battery pack 14. The cell stacks 46A-46D can then be inserted one by one into the enclosure halo 40 using, for example, a 6-axis robotic arm (not shown). The load plates 80 can slide along the interior facing surfaces of the sidewalls 56 to facilitate insertion.

Figure 6:
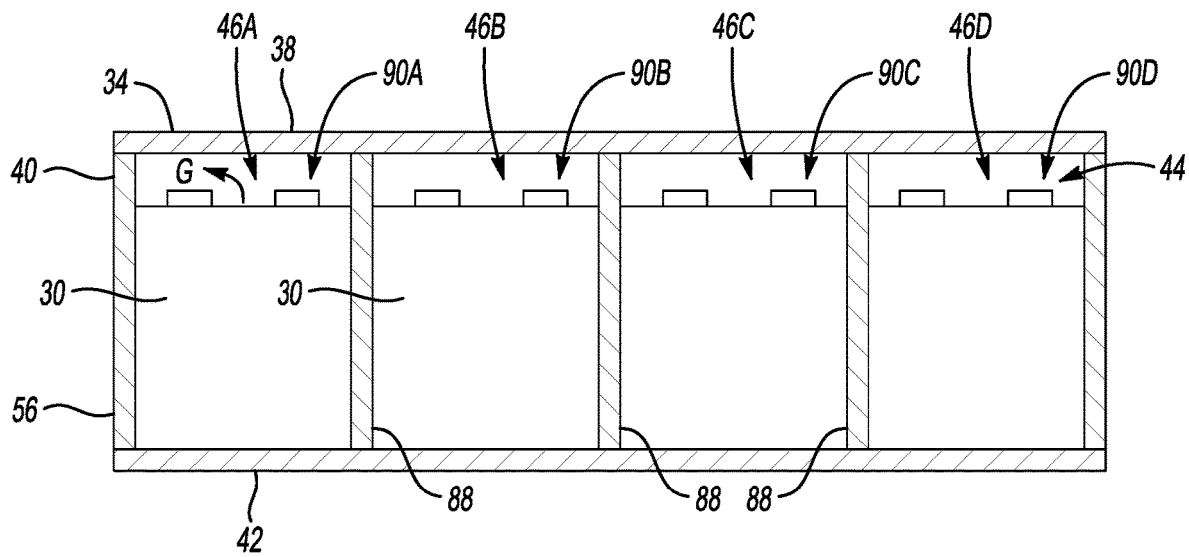
FIG. 6 illustrates a section view of the traction battery pack assembly taken at line 6-6 in FIG. 2 when the traction battery pack assembly is assembled.
Figure 7:
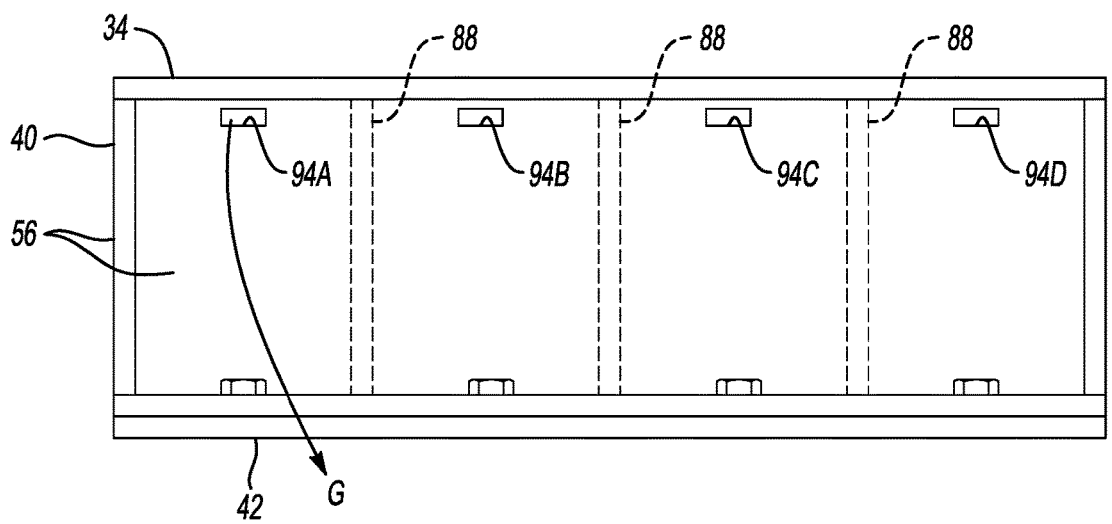
FIG. 7 illustrates a side view of the traction battery pack assembly of FIG. 2 when the traction battery pack is assembled.

With reference now to FIGS. 2, 6, and 7, within the interior area 44, a divider 88 is positioned between the Cell stacks 46A and 46B, between the cell stacks 46B and 46C, and between the cell stacks 46C and 46D. The dividers 88 can be adhesively secured to the sides 66A or 66B of the cell stacks 46A-46D. The dividers 88 may be secured to one of the cell stacks 46A-46D prior to insertion of the cell stacks 46A-46D into the interior area 44. In such examples, the dividers 88 are inserted with the cell stacks 46A-46D.

When the traction battery pack 14 is assembled, the dividers 88 extend from the enclosure floor 42 to the enclosure cover 38. The dividers 88 extend vertically past the battery cells 30 and the load plates 80 of the cell stacks 46A-46D. The load plates 80 and battery cells 30 of the cell stacks 46A-46D rest directly on and directly contact the enclosure floor 42, which can include a heat exchange plate. The dividers 88 directly contact the enclosure floor 42 and the enclosure cover 38 in this example.

The dividers 88 partition the interior area 44 into, in this example, into four different areas 90A-90D that each contain one of the cell stacks 46A-46D. The sidewalls 56 include a plurality of enclosure venting openings 94A-94D. One of the enclosure venting openings 94A-94D corresponds with each of the areas 90A-90D.

During ordinary operation, structures, such as membranes, can be used to cover the enclosure venting openings 94A-94D. If, for example, one the battery cells in the cell stack 46A releases vented gas G, the vented gas G ruptures the structure covering the enclosure venting opening 94A so that the vented gas G can pass to an ambient area outside the interior area 44 and outside all portions of the vehicle 10.

The dividers 88 fluidly isolate the areas 90A-90D from each other. Thus, the vented gas G from one of the battery cells 30 in the cell stack 46A does not move from the area 90A to the arrays 90B-D, which can help to prevent the battery cells 30 in the arrays 90B-90D from entering a thermal runaway condition. Divider 88 could be sealed to the cover, battery floor and side walls with liquid adhesive, gap fillers, or rubber seals, for example.

The dividers 88 can be foam, solid plastic, or metal. The dividers 88 can include an electrical isolation membrane or coating. The dividers 88 can be compressed as the enclosure cover 38 is secured to the enclosure halo 40.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A traction battery pack assembly, comprising:
   first and second cell stacks each disposed along a cell stack axis;
   an enclosure assembly that encloses an interior area, the enclosure assembly having an enclosure structure that holds the first and second cell stacks within a cell-receiving area, the enclosure structure compressing the first cell stack along the cell stack axis of the first cell stack, the enclosure structure compressing the second cell stack along the cell stack axis of the second cell stack; and
   a divider positioned between the first and second cell stacks, the divider partitioning the interior area.

2. The traction battery pack assembly of claim 1, wherein the enclosure structure is a stamped sheet metal enclosure structure.

3. The traction battery pack assembly of claim 1, wherein the enclosure structure circumferentially surrounds the first and second cell stacks.

4. The traction battery pack assembly of claim 1, wherein the enclosure structure is an enclosure tray.

5. The traction battery pack assembly of claim 4, wherein the enclosure assembly further includes an enclosure cover, the divider extending from a floor of the enclosure tray to the enclosure cover.

6. The traction battery pack assembly of claim 5, wherein the enclosure cover includes a first enclosure venting opening configured to communicate vented gas from the area of the interior that contains the first cell stack, and a second enclosure venting opening configured to communicate vented gas from the area of the interior that contains the second cell stack, wherein the divider fluidly isolates the area of the interior that contains the first cell stack from the area that contains the second cell.

7. The traction battery pack assembly of claim 1, wherein the first and second cell stacks each include a first load plate at a first axial end and a second load plate at an opposite second axial end, wherein the first and second cell stacks rest on a floor of the enclosure structure, wherein the divider extends from the floor past the first and second load plates of the first and second cell stacks.

8. The traction battery pack assembly of claim 7, wherein the first load plate and the second load plate directly contact the enclosure structure, wherein the divider directly contacts the enclosure structure and an enclosure cover of the enclosure assembly.

9. The traction battery pack assembly of claim 1, wherein the divider is foam.

10. The traction battery pack assembly of claim 1, wherein the divider fluidly isolates an area of the interior that contains the first cell stack from an area of the interior that contains the second cell stack.

11. The traction battery pack assembly of claim 10, wherein the enclosure structure includes a first enclosure venting opening configured to communicate vented gas from the area of the interior that contains the first cell stack, and a second enclosure venting opening configured to communicated vented gas from the area of the interior that contains the second cell stack, wherein the divider fluidly isolates the area of the interior that contains the first cell stack from the area that contains the second cell.

12. The traction battery pack assembly of claim 1, wherein the divider is adhesively secured to the first and second cell stacks.

13. The traction battery pack assembly of claim 1, wherein the enclosure assembly is an enclosure halo.

14. The traction battery pack assembly of claim 1, wherein the enclosure assembly lacks an enclosure floor.

15. The traction battery pack assembly of claim 14, wherein the enclosure assembly is an enclosure halo, and further comprising an enclosure floor and an enclosure cover secured to the enclosure halo.

16. The traction battery pack assembly of claim 1, wherein the first and second cell stacks span from a first wall of the enclosure assembly to an opposite second wall of the enclosure structure.

17. The traction battery pack assembly of claim 1, wherein the enclosure assembly exerts a compressive force directly on the cell stacks.

18. The traction battery pack assembly of claim 7, wherein the first load plate and the second load plate each have axially facing sides that directly contact the enclosure structure, wherein the divider directly contacts the enclosure structure and an enclosure cover of the enclosure assembly.

19. A traction battery pack assembly, comprising:
first and second cell stacks each disposed along a cell stack axis;
an enclosure assembly that encloses an interior area, the enclosure assembly having an enclosure halo that holds the first and second cell stacks within a cell-receiving area, the enclosure halo compressing the first cell stack along the cell stack axis of the first cell stack, the enclosure halo compressing the second cell stack along the cell stack axis of the second cell stack; and
a divider positioned between the first and second cell stacks, the divider partitioning the interior area, wherein the enclosure halo circumferentially surrounds the first and second cell stacks.

20. The traction battery pack assembly of claim 19, wherein the first and second cell stacks each span from a first side of the enclosure assembly to an opposite second side of the enclosure halo.

* * * * *